United States Patent
Wuidart et al.

(10) Patent No.: US 7,886,163 B2
(45) Date of Patent: Feb. 8, 2011

(54) AUTHENTICATION PROTOCOL WITH MEMORY INTEGRITY VERIFICATION

(75) Inventors: Luc Wuidart, Pourrieres (FR); Pierre Balthazar, Aix En Provence (FR)

(73) Assignee: STMicroelectronics S.A., Montrouge (FR)

( * ) Notice: Subject to any disclaimer, the term of this patent is extended or adjusted under 35 U.S.C. 154(b) by 1282 days.

(21) Appl. No.: 10/489,154

(22) PCT Filed: Sep. 10, 2002

(86) PCT No.: PCT/FR02/03081

§ 371 (c)(1),
(2), (4) Date: Mar. 10, 2004

(87) PCT Pub. No.: WO03/023725

PCT Pub. Date: Mar. 20, 2003

(65) Prior Publication Data

US 2004/0225889 A1   Nov. 11, 2004

(30) Foreign Application Priority Data

Sep. 10, 2001   (FR) .................................. 01 11678

(51) Int. Cl.
| | |
|---|---|
| G06F 12/14 | (2006.01) |
| H04L 9/32 | (2006.01) |
| H04L 29/06 | (2006.01) |
| G06F 17/30 | (2006.01) |

(52) U.S. Cl. .................... 713/194; 713/166; 713/176; 713/189; 726/28; 726/30

(58) Field of Classification Search ............... 713/189, 713/166, 176, 194; 726/28, 30
See application file for complete search history.

(56) References Cited

U.S. PATENT DOCUMENTS

| | | | |
|---|---|---|---|
| 4,786,790 A | 11/1988 | Kruse et al. | |
| 5,191,608 A | 3/1993 | Geronimi | |
| 5,818,738 A * | 10/1998 | Effing | 702/117 |
| 6,299,069 B1 | 10/2001 | Shona | |
| 6,453,416 B1 * | 9/2002 | Epstein | 713/170 |
| 6,581,078 B1 * | 6/2003 | Liardet | 708/250 |
| 6,829,628 B2 * | 12/2004 | Kim | 708/254 |
| 6,925,566 B1 * | 8/2005 | Feigen et al. | 713/187 |

(Continued)

FOREIGN PATENT DOCUMENTS

FR   2 757 979   7/1998

(Continued)

OTHER PUBLICATIONS

International Search Report from the corresponding PCT Application No. PCT/FR02/03081, filed Sep. 10, 2002.

*Primary Examiner*—Kambiz Zand
*Assistant Examiner*—Michael Guirguis
(74) *Attorney, Agent, or Firm*—Lisa K. Jorgenson; James H. Morris; Wolf, Greenfield & Sacks, P.C.

(57) ABSTRACT

The invention relates to a method of supplying a private quantity (s) in an integrated circuit involved in an authentication procedure by means of an external device that takes said private quantity into account. In order to verify the integrity of said memory element, the private quantity is a function of a signature (SIGN) of at least one memory element (4, 10, 11, 12) associated with the integrated circuit.

21 Claims, 2 Drawing Sheets

U.S. PATENT DOCUMENTS

| | | | |
|---|---|---|---|
| 7,017,044 B1 * | 3/2006 | Carpenter et al. | 713/176 |
| 7,380,131 B1 * | 5/2008 | Trimberger | 713/193 |
| 2003/0037237 A1 * | 2/2003 | Abgrall et al. | 713/166 |
| 2003/0046542 A1 * | 3/2003 | Chen et al. | 713/176 |

FOREIGN PATENT DOCUMENTS

| | | |
|---|---|---|
| WO | WO 9 610 811 | 4/1996 |

* cited by examiner

US 7,886,163 B2

AUTHENTICATION PROTOCOL WITH MEMORY INTEGRITY VERIFICATION

BACKGROUND OF THE INVENTION

1. Field of the Invention

The present invention relates to the authentication of an integrated circuit or of an electronic device containing such a circuit, by means of an authentication method using a private or secret datum or quantity contained in the integrated circuit.

The present invention more specifically relates to authentication methods based on the use of a secret datum (also called a private key or datum) by means of an external device. An example of application of the present invention is the field of smart cards, be they of prepaid count unit type or not.

2. Discussion of the Related Art

The various methods of authentication of a smart card or the like aim at avoiding the piracy or the falsification of a card, either by use of a discrete device reproducing the card or by piracy of a read terminal, or by large-scale reproduction of falsified smart cards.

The authentication methods with the highest performances use a private quantity present in the integrated circuit to be authenticated and a so-called public quantity or key, depending on this private quantity and stored in an external device (generally separate from the smart card read device). The private quantity is indirectly involved each time the integrated circuit requires authentication, without any "knowledge transfer". In such so-called "zero-knowledge" methods, the authentication occurs according to a protocol which, in a proved manner and under hypotheses recognized as being perfectly reasonable by the scientific community, reveals nothing of the secret key or private quantity of the entity, the signature of which must be authenticated. Examples of known authentication methods to which the present invention applies are described in French patent application no. 2,716,058 and in U.S. Pat. No. 4,995,082 which are incorporated herein by reference.

Such methods do not send the private quantity itself, but a calculation result taking this private quantity into account, a number which is a function of a random number chosen by the integrated circuit and communicated to the external device, and a random number chosen by the external device and communicated to the card. The result is then checked by the external device to authenticate the card. This checking further uses public keys which are most often certified by another device (generally called the "trusted third party"). In a chip personalization phase, said chip calculates a public key that it transmits, with its identifier, to a "trusted third party". The latter calculates a certificate that it sends back to the chip, which stores it. In use, the chip communicates its identifier and the certificate to the reader. The reader recalculates the public key of the chip based on these two values and a public key of the "trusted third party".

Although high-performance methods hide the private quantity during transfers, they are powerless against piracies inside of the integrated circuit.

In particular, conventional authentication methods and systems do not protect the data contained in the storage elements of the chip card or the like. These data may be formed of processing programs (including the program necessary to the execution of the authentication method) or of various data. Among the data stored, for example, in EEPROM-type memories, is in particular the certified public key of the "trusted third party" enabling the reader to recalculate the public keys of the chips.

The fact that the data and programs are not protected is a breach in the security of smart card systems. This weakness is further increased by the fact that the authentication is performed by the card itself, and thus based on its programs and on the accessible elements of its memory.

Another disadvantage of conventional authentication methods is linked to the use of a private datum, which is further indispensable to make out or differentiate electronic devices or sub-assemblies, for example, smart cards, from one another. The disadvantage precisely is that this quantity is a datum stored in the component to be identified. Such a quantity is accordingly capable of being pirated by examination of the storage element (for example, the registers or the like) of the smart card in which the quantity is stored. Further, the private quantity generally is immutable for a given smart card, to enable repeated authentication thereof. This results in a weakness of the authentication function.

SUMMARY OF THE INVENTION

The present invention aims at improving integrated circuit authentication methods and systems or the like.

The present invention more specifically aims at improving or optimizing the anti-fraud security of electronic devices using an integrated circuit provided with program and/or data storage elements.

The present invention also aims at detecting and preventing any modification of private quantities of an integrated circuit.

To achieve these and other objects, the present invention provides a method for providing a private quantity in an integrated circuit taking part in an authentication procedure by means of an external device taking into account this private datum, which is a function of a signature of at least one memory associated with the integrated circuit, to check the integrity of this memory.

According to an embodiment of the present invention, the signature depends on the content of a program memory of the integrated circuit.

According to an embodiment of the present invention, the signature depends on the content of a non-volatile memory of the integrated circuit.

According to an embodiment of the present invention, the private quantity is a combination of a first quantity representing said signature of the memories and of a second quantity obtained, at least partially, from a physical parameter network.

According to an embodiment of the present invention, the physical parameter network is programmed, at least partially, by a word provided by a storage element.

According to an embodiment of the present invention, the authentication procedure is of symmetrical type, sharing a key with no transmission thereof.

According to an embodiment of the present invention, the authentication method is of a type with public and private keys.

The present invention also provides a method for authenticating an electronic device by means of an external device taking a private quantity of the electronic device into account.

The present invention also provides an integrated circuit including a cell for extracting a private quantity and means for calculating a signature of at least one memory, contained in the integrated circuit or associated therewith, to check the memory integrity.

According to an embodiment of the present invention, the circuit includes means for providing a private quantity.

The foregoing objects, features and advantages of the present invention, will be discussed in detail in the following non-limiting description of specific embodiments in connection with the accompanying drawings, in which:

DETAILED DESCRIPTION

Figure 1:
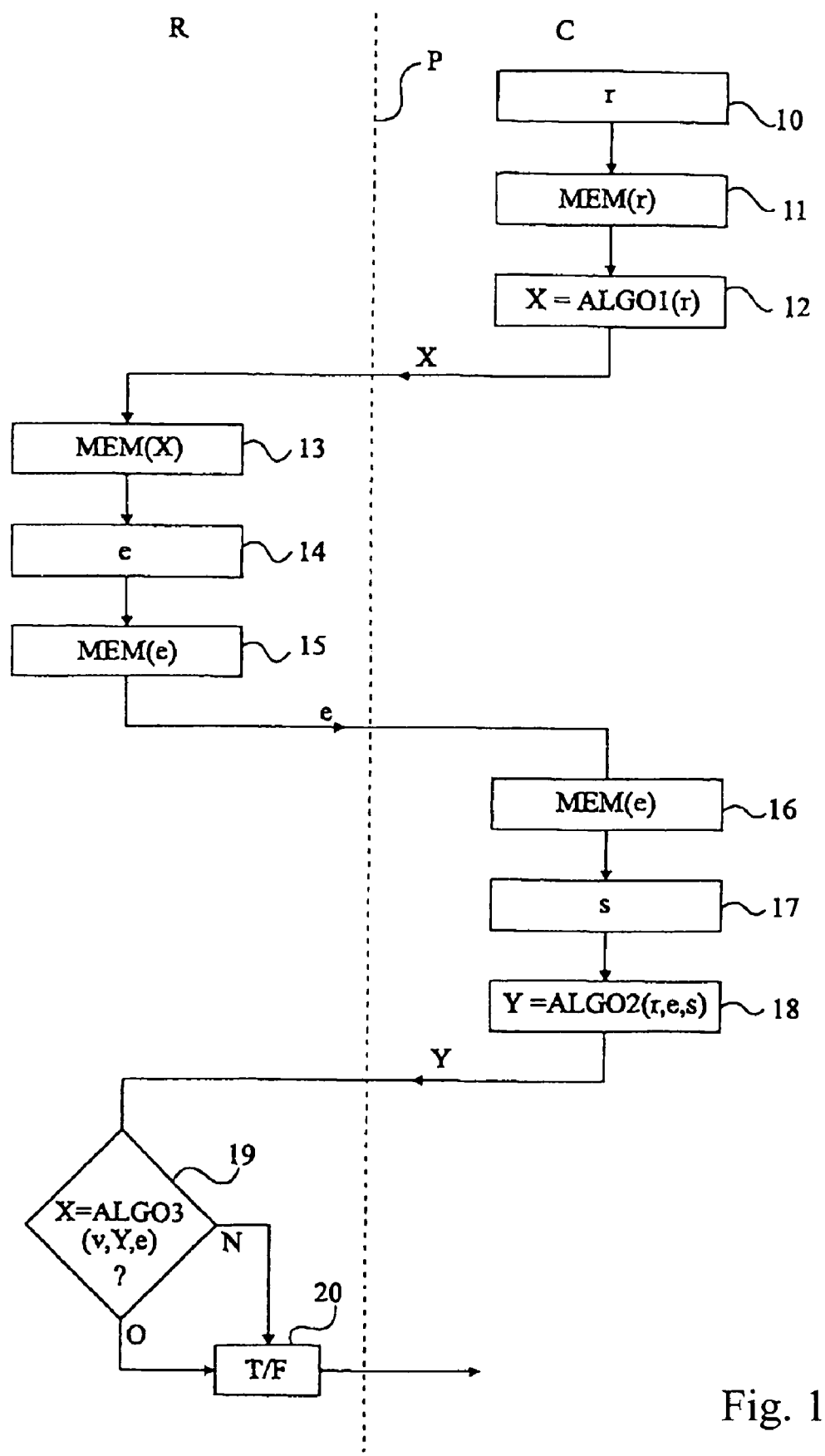
FIG. 1 illustrates in a flowchart an integrated circuit authentication method involving a private quantity, to which the present invention applies.

For clarity, only those method steps and those elements of the circuit that are necessary to the understanding of the present invention have been shown in the drawings and will be described hereafter. In particular, the authentication methods and the algorithms using private quantities are perfectly well known and will not be detailed, except as concerns the provision of the private quantity which is the object of the present invention.

A feature of the present invention is to take into account, in the authentication method, a signature of the content of at least one of the storage elements of the integrated circuit. More specifically, the present invention provides that the private quantity of the chip is a function of a signature of its memory or memories. "Signature" means a binary word representative of the very content of one or several memories of the integrated circuit.

FIG. 1 shows a simplified flowchart illustrating an implementation mode of an authentication procedure of the type to which the present invention applies. This example concerns the authentication of a smart card by an external device. In FIG. 1, the steps of the authentication procedure occurring on the side of card C, or on the side of reader R, have been enhanced, on either side of dotted lines P.

An authentication phase of course follows the introduction of a card into the reader, the sending of an identifier by the card to the reader, then to a central station, its checking by the central station, then the extraction by this central station of a public quantity or key v based on the identifier communicated by the card. This public key most often comes from a key table and is communicated by the central station to the reader. Such a procedure is characteristic of so-called zero-knowledge authentication methods or authentication methods with intervention of a trusted third party.

For the actual authentication phase, a number r is first randomly drawn (block 10), on the side of card C. Number r is stored (block 11, MEM(r)) in the card integrated circuit. Then, a first algorithm ALGO1 providing a result X is applied (block 12) to this number r. Result X is transmitted to reader R, which stores it (block 13, MEM(X)). On the reader side, a random number e is drawn (block 14) and stored (block 15, MEM(e)). Number e is sent to card C, which itself stores it (block 16, MEM(e)).

The card then extracts its private datum s (block 17). The present invention intervenes at this step, in that private quantity s is a function at least of one signature of the content of the card memories. Private datum s is taken into account in a second algorithm ALGO2 (block 18) with data r and e to provide a result Y. Preferably, number r is deleted after having been used to calculate number Y and before the sending thereof. Result Y is sent to reader R, which checks (block 19) by means of a third algorithm ALGO3 that variable X is equal to the application of this algorithm to variables Y, e, and v. Public key v of course is a function of private datum or key s of the card. According to the result of coherence test 19, the reader provides an indicator of an authentication (T) or of no authentication (F) to the card (block 20). The authentication procedure is then over.

An authentication method such as described in FIG. 1 is known, except for the content of step 17 where the present invention intervenes so that private quantity s takes into account at least the signature of at least one memory, contained in the integrated circuit or associated therewith.

According to a specific example of embodiment, the different variables are linked together by the following algorithms and relations:

public key v and private key s are linked by relation $v=g-s$ modulo n, where g represents a cyclic group generator and n an integer;

first algorithm ALGO1 is $X=gr$ modulo n;

second algorithm ALGO2 is $Y=r+e.s$; and third algorithm ALGO3 is $X=gY.ve$ modulo n.

It should be noted that various algorithms are known in the art and may be implemented in using the method of the present invention. For example, public key v may be calculated by the reader or the central station based on the card identifier or on a datum transmitted by said card. According to another alternative, the reader may contain a database of the public keys of the cards that it is supposed to be able to read.

Figure 2:
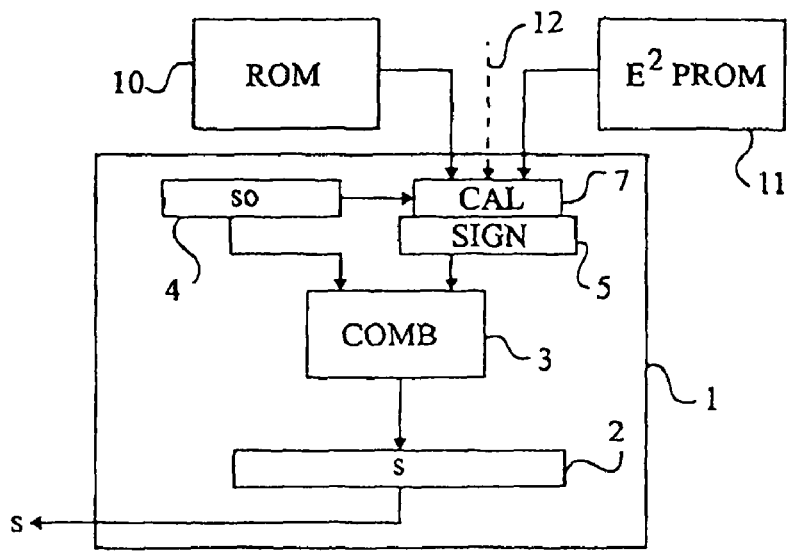
FIG. 2 very schematically shows in the form of block diagrams a first embodiment of a circuit for extracting a private quantity according to the present invention.

FIG. 2 partially and schematically shows a first embodiment of a cell 1 for extracting a private quantity s in an integrated circuit according to the present invention.

Cell 1 of course receives control signals not shown, especially triggering the extraction of quantity s, provided on a single output terminal of cell 1. Inside of cell 1, word s representing the private quantity is temporarily stored (at each request for extraction) in a register 2.

According to the present invention, quantity s is the result of a combination (by any function) illustrated by block 3 (COMB) of a secret quantity s0 and of a signature SIGN of the content of the integrated circuit memories. Quantity s0 is, at least temporarily, stored in a register 4 while signature SIGN is, at least temporarily, stored in a register 5. The outputs of registers 4 and 5 are sent to combiner 3 which provides quantity s to register 2.

The signature stored in register 5 is a function of the content of at least one memory of the integrated circuit. Among these memories of which a signature representative of the content can be taken into account, alone or combined, to form signature word SIGN, one finds:

a memory 10 (ROM) containing the processing programs of the integrated circuit (for example, of the smart card) and especially the program linked to the authentication method;

a read-only memory of EEPROM type 11, which contains, among others, the chip identifier;

register or memory 4 containing secret quantity s0; and any other storage element (symbolized by an access link 12) containing data or programs immutable along the integrated circuit lifetime. Immutable means that these data or program(s) will, by a signature calculation, always provide the same result if they are authentic.

An advantage of the present invention is that it enables, without requiring a specific authentication procedure, checking the integrity of data and/or programs which are not used in the authentication.

Another advantage of the present invention is that this integrity control is not performed by the integrated circuit chip, but is performed by the reader or external device. Indeed, since the signature is incorporated in the private quantity, the reader is in charge of checking whether the quantity (Y, FIG. 1) that it receives from the chip is conformal to the public key which has been transmitted thereto. Now, quantity Y depends on private quantity s.

It should be noted that the public key has been certified by the "trusted third party" in the chip personalization phase, and thus at a time when the integrity does not risk being challenged.

The fact of using a control by the reader makes a possible piracy even more difficult.

In particular, it could have been devised to check the signature of a file or of a memory with respect to the reference signature contained either in a memory of the chip or in the reader. A disadvantage would then be, for the first case, that the data to be contained by the memory have to be known upon manufacturing (to be included in the integrated circuit chip manufacturing masks). Further, this solution leads to a checking on the smart card side, which is less reliable. For the second solution, this requires for the reader to have a table with all possible signatures of the cards that it can receive, which in practice results in obvious memory capacity problems on the reader side.

The signature (content of register 5) which is a function of the different memories may be obtained with any operating method, provided that it provides a word of the chosen size. For example, it may be a checksum-type function or a chopping function (for example, a function known as the SHA function and described in work "Applied Cryptography" by Bruce Schneier, published in 1996 (second edition by Wiley), pages 442 to 445). The calculation of signature SIGN is, for example, performed by a block 7 (CAL) receiving signals from the different memories to be taken into account to calculate binary word SIGN. The function performed by block 7 may be any combination, expansion, arithmetic operation, alone or combined. More generally, the signature calculation function may be any "free collision" function, that is, for which a modification of an input bit is enough to modify the output. The representation of the drawings is functional. In practice, a central control unit will preferentially be used to trigger and clock the readings and calculations.

An advantage of the present invention is that its implementation requires no modification of conventional authentication methods, provided that the extraction of quantity s, made according to the present invention, provides a quantity of expected length or which is compatible with the authentication method and/or circuit exploiting it.

Another advantage of the present invention is that the authenticity test performing by taking the memory signature into account provides no indication of the nature of a possible defect. This makes the detection of the private quantity by a possible pirate even more difficult.

Another advantage of the present invention is that the memories (especially the program memory) may now be, without risking being attacked by modification of their contents, placed outside of the integrated circuit provided that the sole reading of the data reveals nothing to the pirate. Indeed, a pirate will then be unable to take advantage of this externalization since any modification will be detected by the signature.

Figure 3:
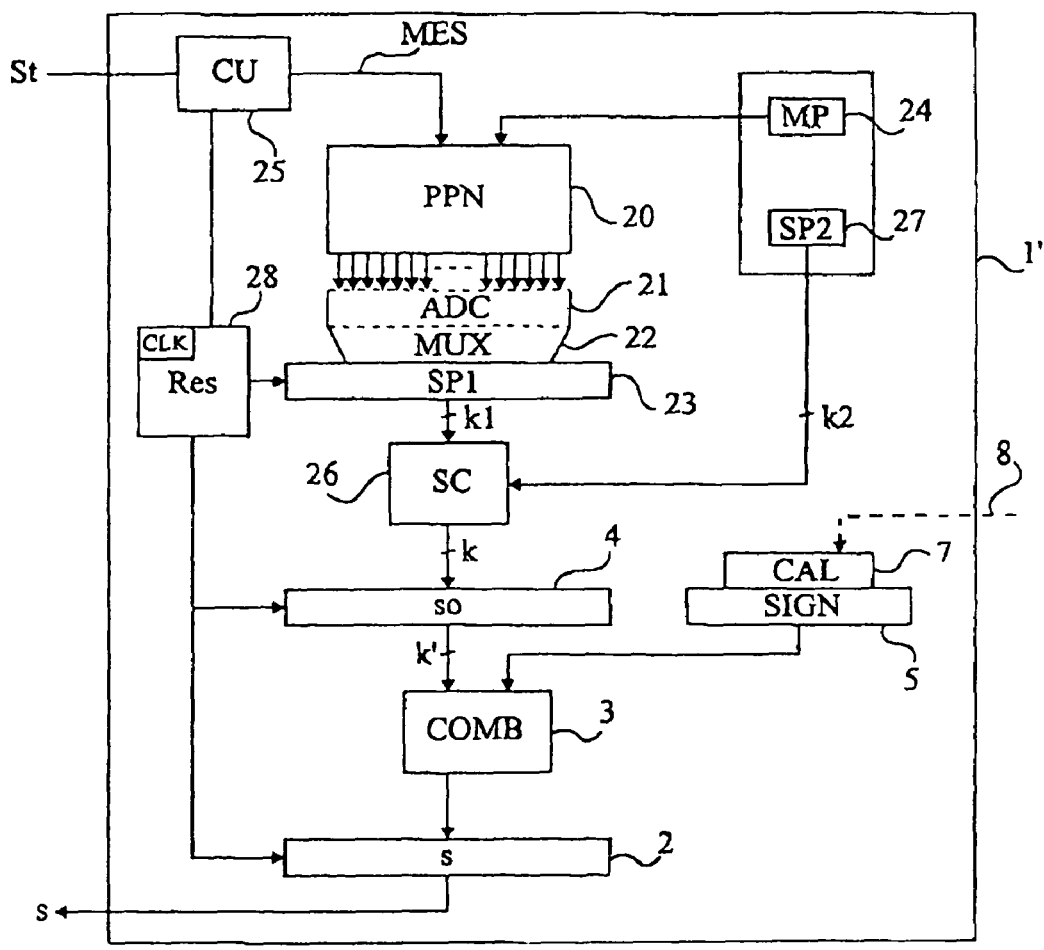
FIG. 3 very schematically shows in the form of block diagrams a second preferred embodiment of a circuit for extracting a private quantity according to the present invention.

FIG. 3 shows a second embodiment of a cell 1' for extracting a private quantity s from an integrated circuit according to the present invention. Cell 1' here includes physical parameter network 20 (PPN) linked to the integrated circuit manufacturing. Physical parameter network 20 provides a large number of signals which take part in the generation of private quantity s0 according to the present invention.

Any physical parameter network including, for example, of measuring electric parameters may be used. It may be, for example, a measurement of a threshold voltage of a transistor, a measurement of a resistance or a measurement of a stray capacitance, a measurement of the current generated by a current source, a measurement of a time constant (for example, an RC circuit), a measurement of an oscillation frequency, etc. Since these features are sensitive to technological and manufacturing process dispersions, it can be considered that the electric parameters taken into account are specific to a manufacturing and form a signature of the integrated circuits resulting from this manufacturing.

In the example of a measurement of electrical parameters, the signals coming from network 20 are converted into digital signals by means of an analog-to-digital converter 21 (ADC) and may be multiplexed by a multiplexer 22 (MUX) to form a binary word SP1, stored in a register 23. Word SP1 is thus sensitive to technological and manufacturing process dispersions and represents the hardware signature of the chip.

Converter 21 and multiplexer 22 have been shown in dotted lines since they are optional elements. In particular, converter 21 may be omitted in an embodiment of the physical parameter network directly providing a digital word.

Preferably, the electrical parameters measured by means of network 20 are not always the same. Said network then is programmable. It is parameterized or configured upon each measurement based on a binary word MP, stored in a register 24. Word MP is specific to the integrated circuit chip and may be individualized from one card to another.

The measurement of the physical parameters is started by a signal MES coming from a control unit 25 (CU) of cell 1'. Word SP1 is provided to a combiner 26 (SC) also receiving a binary word SP2 stored in a register 27. The function of circuit 26 is to combine words SP1 and SP2 to provide secret quantity s0, stored in register 4. As a specific example of implementation, the combination performed by combiner 26 may be of the following type:

$s = ((SP1 - SP2)2 + (SP1 + SP2)2)2$ modulo q, where q is a prime number over k bits. Number s0 then is a k-bit word obtained from words SP1 and SP2 respectively over k1 and k2 bits. Preferably, numbers k1 and k2 of bits of words SP1 and SP2 are equal. This enables maintaining the same difficulty for a possible pirate in the case where a portion SP1 or SP2 of word s0 should be discovered.

Like number MP, number SP2 is different from one card to another. Combiner 26 guarantees the size of datum s0 and a non-zero value. The use of a quantity SP2 specific to the card guarantees that private key s0 is unique, whatever datum MP provided to physical parameter network 20 for configuration.

The forming of a physical parameter network may be, for example, a network of resistances and/or of switchable capacitors associated in parallel and/or in series, the switches being controlled according to configuration signals MP arriving on network 20. Circuits using a time measurement may also be used. For example, the read/write time of an EEPROM-type memory is measured. An example of a physical parameter network of this type is described in U.S. Pat. No. 5,818,738 which is incorporated herein by reference.

Cell 1' also includes, like cell 1 of FIG. 2, a combiner 3 of quantity s0 with a signature SIGN contained in register 5. Signature SIGN is calculated by block 7 (CAL). FIG. 3 shows the taking into account of the content of memories external to cell 1'. However, the content of register 4 containing quantity s0 may, here again, be taken into account in the signature.

According to the preferred embodiment illustrated in FIG. 3, cell 1' further includes a reset circuit 28 (RES, reset or set) of some of its registers. Circuit 28 especially has the function of making the presence of quantities s and s0 in registers 2 and 4 temporary. To guarantee an optimal security, circuit 28 controls the resetting not only of registers 4 and 2, but also of register 23 containing quantity SP1 extracted from network 20 and of register 5 containing signature SIGN of the memories. In other words, the lifetime of private quantity s and/or of its components is set from its generation.

An advantage of the present invention is that by combining the use of a physical parameter network and/or a signature of the memories to condition at least part of the private quantity, with the use of a temporized reset of the storage elements storing this private quantity, a possible pirate is prevented from discovering the private quantity of the card, for example, by visual examination.

The combinations of parameters MP and SP2 conditioning the obtaining of private quantity s0 increase the difficulty of piracy. It should however be noted that the use of such a combination is optional. Circuit 28 is, for example, controlled by a clock CLK triggered by control unit 25 upon arrival of a signal St for triggering the extraction of private quantity s.

According to an embodiment of the present invention, applied to the case where a code is typed by the card user, said code may be stored, in a direct or modified manner, in register 27 to form code SP2. In this case, circuit 28 may also reset register 27 to prevent the permanent presence of code SP2 on the card.

Of course, the present invention is likely to have various alterations, modifications, and improvement which will readily occur to those skilled in the art. Although the present invention has been described in relation with a specific authentication process, it applies whatever the envisaged authentication procedure, provided that this procedure generates no specific constraints (except for the length) on the obtaining of the private quantity.

As an example, a so-called SCHNORR protocol described, for example, in above-mentioned work "Applied Cryptography", pages 510 to 512, or in document U.S. Pat. No. 4,995, 082 may be used.

Further, reference has been made to storage registers which may be replaced with any adapted storage element, for example, memories or memory portions, volatile or not according to the type of stored data. Further, the writing into and the reading from these storage elements may be series or parallel.

Finally, although the implementation of the present invention has been described in relation with a hardware example, it may be performed by software means, its practical implementation being within the abilities of those skilled in the art based on the functional indications given hereabove.

Having thus described at least one illustrative embodiment of the invention, various alterations, modifications, and improvements will readily occur to those skilled in the art. Such alterations, modifications, and improvements are intended to be within and scope of the invention. Accordingly, the foregoing description is by way of example only and is not as limiting. The invention is limited only as defined in the following claims and the equivalents thereto.

What is claimed is:

1. A method for providing a private quantity in an integrated circuit taking part in an authentication procedure by means of an external device taking into account the private quantity, the method comprising:

generating a quantity by combining a first binary word representing an immutable physical signature of the integrated circuit and formed as a result of measurements of at least one electrical parameter by a physical parameter network and a second binary word specific to the integrated circuit; and combining the quantity and a signature of the at least one memory to generate the private quantity to check the integrity of at least one memory associated with the integrated circuit, wherein the first binary word, the quantity and the private quantity are stored in temporary registers.

2. The method of claim 1, wherein the signature depends on content of a program memory of the integrated circuit.

3. The method of claim 1, wherein the signature depends on content of a non-volatile memory of the integrated circuit.

4. The method of claim 1, wherein the physical parameter network is programmed, at least partially, by a word provided by a storage element.

5. The method of claim 1, wherein the authentication procedure is of a type with public and private keys.

6. A method for authenticating an electronic device by means of an external device taking a private quantity of the electronic device into account, wherein said private quantity is obtained by the implementation of a method for providing the private quantity in an integrated circuit taking part in an authentication procedure by means of an external device taking into account the private quantity, the method for providing the private quantity comprising:

generating a quantity by combining a first binary word representing an immutable physical signature of the integrated circuit and formed as a result of measurements of at least one electrical parameter by a physical parameter network and a second binary word specific to the integrated circuit; and combining the quantity and a signature of the at least one memory to generate the private quantity to check the integrity of at least one memory associated with the integrated circuit, wherein the first binary word, the quantity and the private quantity are stored in temporary registers.

7. An integrated circuit comprising:

a cell for extracting a private quantity and calculating a signature of at least one memory contained in the integrated circuit or associated therewith, to check the memory integrity, wherein the private quantity is a function of the signature of the at least one memory and of a second quantity obtained, at least partially, from a first binary word comprising an immutable physical signature of the integrated circuit provided and formed as a result of measurements of at least one electrical parameter by a physical parameter network and a second binary word specific to the integrated circuit, wherein the first binary word, the second binary word and the private quantity are stored in temporary registers.

8. The integrated circuit of claim 7, including means for providing the private quantity from an external device taking into account the private quantity, wherein the private quantity is a function of a signature of at least one memory associated with the integrated circuit, to check the integrity of said memory.

9. A method of generating a private quantity to authenticate an integrated circuit, the method comprising:

checking the integrity of at least one memory associated with the integrated circuit by running a signature calculation function to generate a signature for the at least one memory; and generating the private quantity at least partially based on combining the signature for the at least one memory and a quantity, wherein the quantity is generated from a first binary word representing an immutable physical signature of the integrated circuit and formed as a result of measurements of at least one electrical parameter by a physical parameter network and a second binary specific to the integrated circuit, wherein the first binary word, the quantity and the private quantity are stored in temporary registers.

10. The method of claim 9, wherein the immutable physical signature is based, at least partially, on an output of the physical parameter network, the output having a value that is based on at least one physical parameter of at least one component of the physical parameter network.

11. The method of claim 9, wherein the signature calculation function comprises a checksum-type function and/or a chopping function.

12. The method of claim 9, wherein the signature calculation function is a free collision function.

13. The method of claim 9, wherein the signature is calculated based on data and/or a program stored in the at least one memory, the data and/or program being designed to be immutable over a lifetime of the integrated circuit.

14. The method of claim 9, wherein the signature calculation function is designed such that tampering with the at least one memory causes the signature to be incorrect, such that the integrated circuit fails authentication.

15. An integrated circuit comprising:
a circuit that generates a secret quantity by combining a first binary word representing an immutable physical signature of the integrated circuit formed as a result of measurements of at least one electrical parameter by a physical parameter network and a second binary word specific to the integrated circuit;
a calculating circuit that calculates a signature of at least one memory to check the integrity of the at least one memory, wherein the at least one memory is contained in the integrated circuit or associated therewith; and
a combining circuit that combines the secret quantity and the signature into a private authentication key, wherein the first binary word, the secret quantity and the private authentication key are stored in temporary registers.

16. The integrated circuit of claim 15, wherein the at least one memory comprises a non-volatile memory, and wherein the signature at least partially depends on data stored in the non-volatile memory that is immutable unless a tampering of the non-volatile memory occurs.

17. The integrated circuit of claim 15, wherein the at least one memory comprises a program memory.

18. The integrated circuit of claim 15, wherein the at least one memory comprises a plurality of memories.

19. The integrated circuit of claim 15, wherein the integrated circuit is at least a portion of a smart card, the smart card comprising the at least one memory.

20. The integrated circuit of claim 15, wherein the immutable physical signature of the integrated circuit is linked to a manufacturing process in which the integrated circuit is formed.

21. The integrated circuit of claim 1, wherein the immutable physical signature of the integrated circuit is linked to a manufacturing process in which the integrated circuit is formed.

* * * * *